J. WEBSTER.
Car Spring.
No. 8,496.
2 Sheets—Sheet 1.
Patented Nov. 4, 1851.
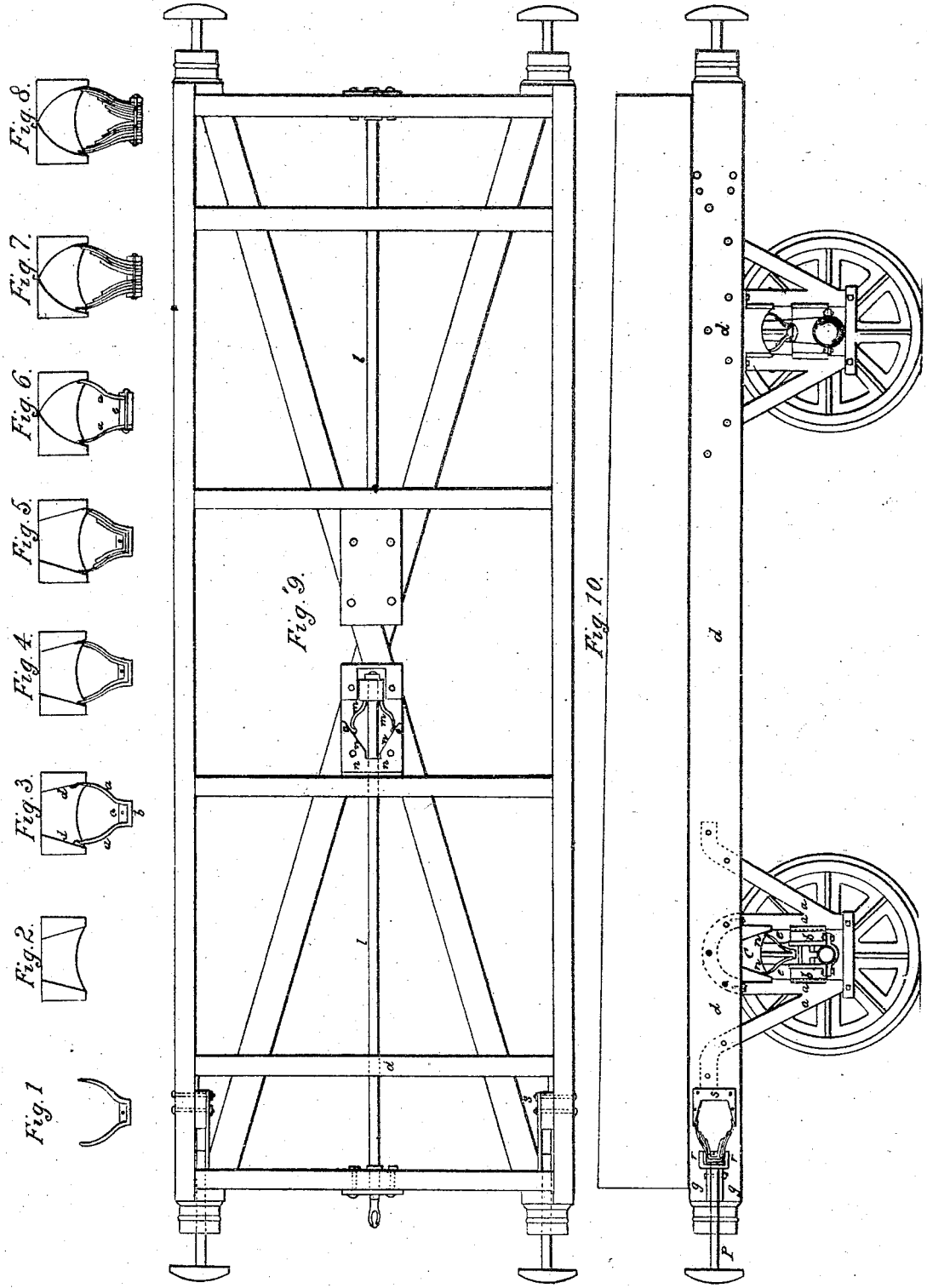

J. WEBSTER.
Car Spring.
No. 8,496.
2 Sheets—Sheet 2.
Patented Nov. 4, 1851.
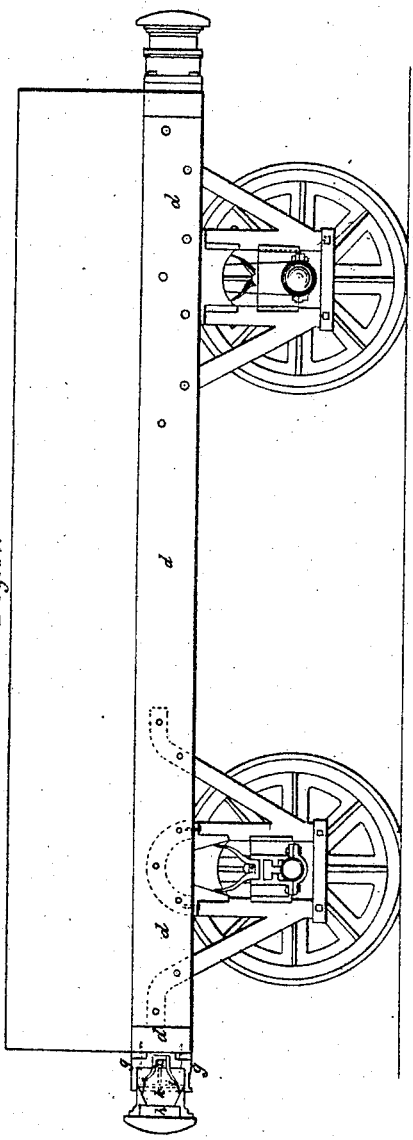
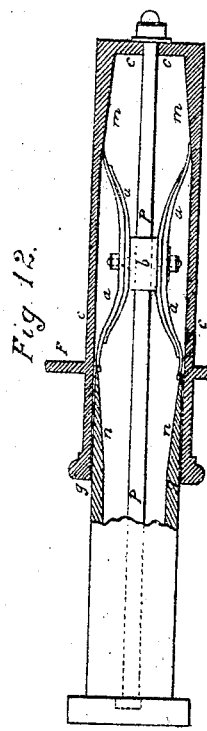
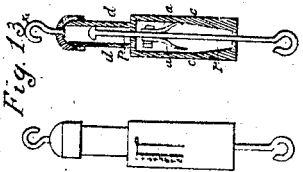
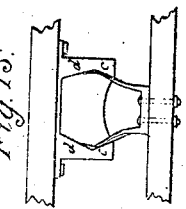
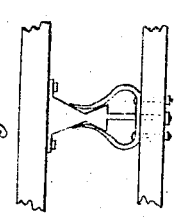
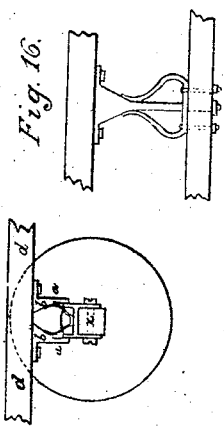

UNITED STATES PATENT OFFICE.

JAMES WEBSTER, OF LEICESTER, ENGLAND.

SPRING.

Specification of Letters Patent No. 8,496, dated November 4, 1851.

*To all whom it may concern:*

Be it known that I, JAMES WEBSTER, of Leicester, England, engineer, a subject of the Queen of Great Britain, have invented or discovered new and useful Improvements in the Construction and Means of Applying Carriage and Certain other Springs, and I, the said JAMES WEBSTER, do hereby declare that the nature of my invention and the manner in which the same is to be performed are particularly described and ascertained in and by this present specification or instrument in writing, reference being had to the several drawings hereunto annexed—that is to say—

My said improvements in the construction and means of applying springs consist in constructing such springs so that each point or arm of a spring may act against an incline or inclined plane for the purpose of obtaining the action of the spring by means of such application of its points or arms to such inclined planes, when such a spring is used as a bearing spring, the spring may be placed upon the carriage or other sustaining body and the inclined planes against which the points or arms of the spring are to act upon the body to be sustained or the inclined planes may be placed upon the sustaining body and the spring upon the body to be sustained whichever may be most convenient, and when a spring is intended to be used for any other purpose the spring may be placed upon one body and the inclines or inclined planes upon the other in such a manner that the action of the spring may be obtained by its points or arms being applied to and acting against the inclined planes.

In constructing a spring according to my invention I prefer to make it with two arms acting in contrary directions (as shown in Figure 1 of the said drawing) the arms being connected together at their bases and being also fixed securely upon the carriage or other body to which the spring is to be attached. When the spring is so constructed I place the inclines or inclined planes against which the arms or points of the spring are to act in such a position that they will form a figure somewhat resembling the letter V (as shown in Fig. 2) the points or arms of the spring acting against the inclined planes in the interior of the figure as shown in Fig. 3. This I believe to be the most advantageous manner of applying springs to inclined planes for the purpose of obtaining the requisite action of the springs but the springs may be applied so as to act against inclined planes in several ways as shown in the said drawings hereunto annexed.

A spring according to my invention may either be made of a spring plate as shown in Figs. 1, 3 and 6 or of several plates as shown in Figs. 4, 5, 7 and 8.

In Fig. 3 is a side view of a spring and of the inclines against which the arms of the spring are to act. In this figure $a$, $a$, are the two arms of the spring connected together at their bases by a cross piece $b$ the whole being made in one piece and of a single plate of steel. C is a piece of metal by means of which the spring is secured in its proper position and the binding of the cross piece $b$, is prevented. $d$, $d$, are the two inclines or inclined planes against which the arms of the spring are to act and which must be fixed or held securely in their intended positions. If a weight or other force be applied to the base $b$, of the spring the effect will be to force the arms of the spring down the inclined planes $d$, $d$, to an extent proportionate to the weight or amount of force applied to the spring. The strength of the spring and also the length and angles of the inclined planes against which its arms are to act may be made to vary according to the weight or force which the spring shall be intended to sustain and the extent of action of which the spring is intended to be capable.

In Fig. 4 I have shown a similar spring and the inclines against which the arms of the spring are to act, the spring shown in this figure being made of two plates instead of one. And in Fig. 5 I have shown a similar spring made of three plates with its inclines.

In Figure 6 I have shown a spring, each arm, $a$, of which is made of a single plate of steel and the bases of the arms are secured to a cross piece $e$, by means of a bolt and met as shown in the figure.

In Fig. 7 I have shown a spring each arm of which is made of four plates of steel the arms being secured and held together at their bases by means of a bolt and nut without any cross piece and in Fig. 8 is shown a similar spring, each arm being made of six plates of steel. It is evident that the number of plates used in the construction of a spring or its arms may be varied according to circumstances but I deem a single plate to be better than several in a majority of cases.

In Figs. 2, 3, 4 and 5 I have shown each of the inclines or inclined planes against which the points or ends of the arms of the springs are to act, as being straight from top to bottom. But in Figs. 6, 7 and 8 I have shown the inclines against which the arms are to act as being curved instead of straight, this construction of inclines being intended to be adopted in those cases in which the power of the incline to deflect the arms of the spring shall increase as the arm approaches the bottoms of the inclines.

In Figs. 9, 10 and 11 I have shown such springs as I have described and their inclines applied to railway carriages as bearing springs, draw springs and buffer springs.

Fig. 9 is a horizontal longitudinal section of a railway carriage for carrying a first or second class carriage body. $d$, is the framework of the carriage. $l, l$, are ordinary draw bars with the improved spring applied thereto. $m, m$, are the two arms of the spring. $n, n$, is a casting which contains two inclines or inclined planes, as shown in section. $o, o$, are two friction rollers to prevent the points or ends of the spring being worn by friction with passing along the inclines. When the draw bar, $l$, is drawn out by the force of the engine the ends of the spring will be drawn with it and pass along the faces of the inclines $n, n$. The inclines will cause the arms of the spring to collapse or be deflected toward each other and thus produce an action which will have a tendency to pull the draw bar back again into the frame of the carriage whenever the force shall be removed or sufficiently diminished.

Fig. 10 represents a side elevation of a railway carriage similar to that shown in Fig. 9, some of the parts in Fig. 10 being shown in section. In this figure I have shown my improved springs applied both as buffer springs and as bearing springs. $p$, is the buffer rod. $q, q$, is a casting which receives the end of the rod, $p$, and this rod is secured by means of a pin as shown in section. The casting $q, q$, receives the bottom end of the spring, $r, r$, which is fastened to the casting by means of a bolt in the center of the spring $r, r$, as shown in section. S is a casting which is fastened to the inside of the carriage frame, $d$, by means of four bolts passing through the framework of the carriage, $d$, as shown in section. The casting S is made with two inclines or inclined planes as also shown in section. When pressure is applied to the buffer head it will drive the spring $r, r$, along the two inclines in the casting S, thus causing the arms of the spring to collapse or be deflected either until the points of the arms reach nearly to the bottom of the inclines when the buffer head comes home or until the power of the collapsed arms of the spring shall be sufficient to resist the force applied to the buffer when the pressure is released from the buffer head the force of the spring will cause the points of the spring to recede toward the outer ends of the inclines and will thus force back the buffer rod, $p$, into its previous position. In Fig. 10 I have also shown my improved springs applied as bearing springs for a railway carriage. $a, a$, is the ordinary axle guard. $b, b$, is the ordinary axle box. $e, e$, is the spring shown as formed of two plates which is fixed to the axle bar by a pin, $f$, passing through the center of a block placed within the spring as shown in the figure. On the top end of the axle box, $b$, there is a cavity formed to receive the bottom end of the spring, $e, e$, as shown in the figure. C is a casting furnished with two slots to fit the wings of the axle guard, $a, a$, and this casting being slid up within the wings of the guard is there fastened by two bolts to the framework of the carriage $d, d$. The casting C is provided with two inclines or inclined planes, $n, n$, shown in the figure. The inclines, $n, n$, when forced downward by the weight or load of the carriage will cause the ends of the springs to collapse or be deflected toward each other to an extent proportionate to the strength of the springs and the weight or force which they may have to sustain. The strength of the springs and also the angles of the inclines should be so regulated that the springs shall sustain the greatest load which the carriage is intended to carry without being driven home to the bottom of the inclines either by the weight of the load or the motions of the carriage. I have shown these bearing springs with their points at or near to the positions which they should occupy when the carriage they bear is unloaded and I prefer to regulate the strength of the springs and the angles of the inclines so that when the carriage is loaded and at rest the points of the springs will press against the inclines at their centers or nearly so and thus allow the same extent for the action of the springs in each direction. It will be evident that when the load or weight is removed from a carriage the two ends or points of the bearing springs will spring open and acting against their inclines will raise the carriage to its previous position.

Fig. 11 represents an ordinary railway truck to which my improved springs have been applied as buffer and also as bearing springs, some of the parts being shown in section. The buffers attached to this truck are of the description called cylinder buffers but made with my improved springs. In this buffer, $g$, is an ordinary cylinder which is fastened to the framework $d$, of the truck by means of two pins as shown by dotted lines in the figure. *h* is the ram which fits the cylinder. *i, i,* is the spring made of a single plate of steel and each of its ends is provided with a smaller roller to prevent the friction from wearing the ends of the spring or the surfaces of the inclines. The piston or ram *h*, is provided with two inclines or inclined planes agaisnt which the points of the springs with their rollers act so that when pressure or a blow is given to the buffer head of the ram, *h*, it will be driven into the cylinder *g*, the two inclines causing the two ends of the spring to collapse or be deflected toward each other to an extent proportionate to the force applied to the buffer—and the force of the spring will press the ram outward whenever the force applied to the buffer head shall be removed or diminished. This cylinder is provided with a pin, *k*, for holding the ram in its proper position and for preventing it from working loose or getting out of order. This pin, *k*, also serves to screw the ram *h*, down on to the ends of the spring to give it a proper bearing on the ends of the spring. At the bottom of the cylindr a cavity is formed to receive the end of the spring, *i, i*, which is fastened by means of a pin passing through the center of a block (placed within the spring) into the sides of the cavity. In Fig. 11 I have also shown my improved springs applied as bearing springs in a similar manner as shown in Fig. 10 each of the springs shown in Fig. 11 being made of one plate of steel instead of two plates and the ends of the springs being also provided with rollers to prevent the friction from wearing the ends of the spring or the faces of the inclines.

In Fig. 12 I have shown the application of my improved springs in the formation of a stationary buffer which I deem to be useful for railway purposes. C, C, C, C, is the outer cylinder of the buffer fixed by means of two flanges F F. This cylinder is furnished with a pair of inclines, *m, m*, against which two points of the springs are to act. Within this cylinder is an inner cylinder *q, q*, furnished with a buffer head in which is fixed one end of the rod, *p, p*, and this rod passes freely through the block which carries the springs and also the closed end of the outer cylinder so as to keep the inner cylinder and the springs in their proper positions and the loose end of the rod has a nut thread upon it to prevent the inner cylinder from being thrown out. This inner cylinder is furnished with two inclines, *n, n*, against which the other two points of the springs are to act. *a, a,* and *a, a,* are two springs each of which is made of a pair of plates and fixed securely upon a perforated block of iron, *b*, and this block fitting loosely upon the rod *p, p*, allows the free action of the springs in each direction. Upon pressure being applied to the buffer head the inner cylinder will be driven in, but meeting with the resistance occasioned by the action of the points of the springs against the inclines *m, m,* and *n, n,* the inner cylinder will only be driven in until the resistance of the springs acting against the inclines shall be equal to the force applied to the buffer head and upon the pressure against the buffer head being removed or diminished the springs will force the outer cylinder and its buffer head back to the extent allowed by the rod, *p, p*, on the pressure against the buffer.

In Fig. 13 I have shown the application of my spring to an apparatus which may be called a suspender and which may be used as a weighing apparatus. In this figure C, C, is a case having two inclines, *m, m,* within it, and a cylinder, *d, d,* fixed upon the upper end of it. Upon the upper end of this cylinder is secured a cap, furnished with a hook X, for suspending the apparatus. The rod, *p, p*, is furnished with a stop or nob, which works freely up and down within the cylinder and prevents the rod from being drawn too far out, the springs *a, a,* are secured upon the rod, *p, p*, in such position that their points will act against the inclines *m, m,* and the lower end of the rod is furnished with a hook, *y*, to hold anything which is to be suspended by it. The rod, *p, p*, works freely in orifices at the top and bottom of the case, so to allow the free action of the rod upward and downward to the extent permitted by the stop which works in the cylinder. The application of any weight to the hook, *y*, will draw down the rod until the action of the springs against the inclines shall cause the inclines to be equal to the amount of the force applied to the hook, *y*, and upon the weight being removed the springs acting against the inclines will draw the rod up to its former position. When this apparatus is intended to be used for weighing, the rod may be indexed as shown in the figure, or the apparatus may be furnished with an index plate for indicating the various weights of the bodies which may be suspended by the hook, *y*.

In Fig. 14 I have shown the application of my spring as a bearing spring for a dray or cart. In this figure, *d, d,* is a portion of the framing of the dray, on the under side of which is secured a square box or casting *b, b,* having two inclines in the inside of it against which the parts of the spring are intended to act. *x*, is the axle tree of the dray upon which is secured a casting *c, c,* the lower part of which embraces the axle tree and within the upper portion of it is secured the spring, *a, a,* shown in the figure. The upper part of the casting *c, c,* works within the box *b, b,* and the weight of the dray will cause the inclines to press against the points of the springs a, a, and thus produce the intended action of the spring.

Instead of making the various inclines in the manner which I have described they may be so made that each incline shall have a double action, thus in Fig. 15 I have shown a pair of inclines, the portions, $d$, $d$, of which are similar to the inclines shown in Figs. 2, 3, 4 and 5 but I have added the additional or return inclines $c$, $c$, by means of which the arms of the springs may be made to press against inclines when drawn up as well as when forced down. These additional inclines may be useful either for preventing a jerking motion of the spring when it is in use or for preventing the spring from being thrown out of its place.

In Fig. 16 I have shown another method of applying my springs to inclined planes. The two arms of a spring when so made press toward instead from each other and against two inclined planes placed between the arms of the spring and the action of the spring is obtained by the points of the spring pressing up and down those inclined in like manner as hereinbefore described; this description of spring may also be used in conjunction with double inclines as shown in Fig. 17.

The forms and dimensions of the springs made and used according to my invention may be varied according to the purposes to which they are to be applied and the forms and dimensions of the inclines or inclined planes may also be varied in a similar manner.

Having described the nature of my said invention and the manner of performing the same I declare that I claim as of my invention The above specified mode of arranging or combining springs and inclined planes or surfaces curved or plane so that the points or arms of the springs may be applied to or press against the inclines or inclined planes, for the purposes of thereby producing the action of the springs in manner hereinbefore described.

JAMES WEBSTER.

Witnesses:
 WM. H. J. RITCHIE,
 JOSEPH MARQUELL.